No. 745,550. PATENTED DEC. 1, 1903.
W. ZSCHOKKE & F. URBAN.
PHOTOGRAPHIC OBJECTIVE.
APPLICATION FILED FEB. 14, 1903.
NO MODEL.
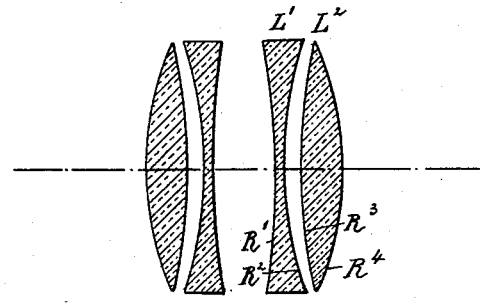

WALTHER ZSCHOKKE AND FRANZ URBAN, OF STEGLITZ, NEAR BERLIN, GERMANY, ASSIGNORS TO THE FIRM OF C. P. GOERZ, OF FRIEDENAU, NEAR BERLIN, GERMANY.

PHOTOGRAPHIC OBJECTIVE.

SPECIFICATION forming part of Letters Patent No. 745,550, dated December 1, 1903.

Application filed February 14, 1903. Serial No. 143,446. (No model.)

*To all whom it may concern:*

Be it known that we, WALTHER ZSCHOKKE and FRANZ URBAN, citizens of the German Empire, and residents of Steglitz, near Berlin, in the Kingdom of Prussia and German Empire, have invented certain new and useful Improvements in Photographic Objectives, of which the following is a specification.

Our invention relates to an objective for photographic purposes composed of a biconcave lens and a biconvex lens, leaving between them an air-space having the form of a positive meniscus; and it consists in certain improvements hereinafter specified, and pointed out in the claims. Hitherto it has been thought necessary in connection with objectives of this kind to employ glass of low refractive power for the manufacture of the biconcave lens and to employ glass of high refractive power for the biconvex lens, as may be seen from United States Patent No. 635,472 to Goerz and von Höegh. Now it has been found that all defects of the image produced, especially spherical and chromatic aberration and astigmatism, effectually can be eliminated in a two-lens system consisting of a biconvex lens and a biconcave lens if the biconvex crown-glass lens has a refractive power equal to or lower than that of the biconcave flint-glass lens. This result can be obtained without materially altering the exterior shape of the lenses. Consequently the relative dispersions of the lenses, or, more correctly spoken, of the kinds of glass from which the lenses are formed, may be the same as in the case of the objective forming the object of the said United States patent numbered 635,472, whereas the absolute amounts of dispersion obviously must be different.

A double objective in accordance with our invention is represented on the accompanying drawing.

$L'$ is the biconcave lens, and $L^2$ the biconvex lens, of the two-lens system forming the object of the invention.

$R'$ $R^2$ $R^3$ $R^4$ designate the several surfaces of the lenses and at the same time the radii of curvature of same.

The constructional elements of the new objective are given in the table below in millimeters, the focal length or distance of the objective being two hundred and forty millimeters, and the greatest effective area or opening being about two-elevenths of the focal length or distance.

| Radius of curvature of the surface. | Length. | |
|---|---|---|
| $R'$ | −136.00 | $d'=2.03$ (thickness of the lens $L'$.) |
| $R^2$ | +81.34 | $d^3=3.51$ (thickness of the layer of air between the lenses.) |
| $R^3$ | +124.30 | $d^2=8.63$ (thickness of the lens $L^2$.) |
| $R^4$ | −63.81 | |

The glass employed has the following optical properties:

$L'$: $n_D = 1.53296$ $n_{G_1} = 1.56199$ $C−F = 0.01094$.

$L^2$: $n_D = 1.51272$ $n_{G_1} = 1.52349$ $C−F = 0.00870$.

The novel feature of the above-described objective over the objective of the United States Patent No. 635,472, referred to, consists in the substitution of the barium crown-glass of high refractive power (for the biconvex lens) by ordinary silicate crown-glass of lower refractive power. This modification is of high practical value in view of the fact that barium crown-glass is very precious, and nevertheless its high price not free from bubbles and blisters, causing considerable loss of material in the manufacture of the lenses. The silicate crown-glass, on the contrary, only costs one-third of the price of the barium crown-glass and can easily be manufactured in clear and uniform quality, so that the loss of material is considerably diminished. Moreover, the silicate crown-glass is in a higher degree transparent, light, and permanent.

It is obvious that we may combine two objectives of the kind above described in order to obtain a double objective having certain advantages over the simple two-lens objective, as is well understood.

Having now particularly described and ascertained the nature of our said invention and in what manner the same is to be performed, we declare that what we claim is—

1. A two-lens objective for photographic purposes consisting of a biconcave lens and a biconvex lens leaving between them an air-space having the form of a positive meniscus, said biconcave lens having high refractive power and said biconvex lens having low refractive power.

2. An objective consisting of two compound systems, each composed of a biconcave lens and a biconvex lens, leaving between them an air-space having the form of a positive meniscus, said biconcave lens having high refractive power and said biconvex lens having low refractive power.

Signed this 27th day of January, 1903, at Berlin.

WALTHER ZSCHOKKE.
FRANZ URBAN.

Witnesses:
HENRY HASPER,
WOLDEMAR HAUPT.